Feb. 12, 1929.                    1,701,537
A. MOORE
INTERIOR AGITATOR FOR INTERNAL COMBUSTION ENGINES
Filed Dec. 20, 1926        3 Sheets-Sheet 1
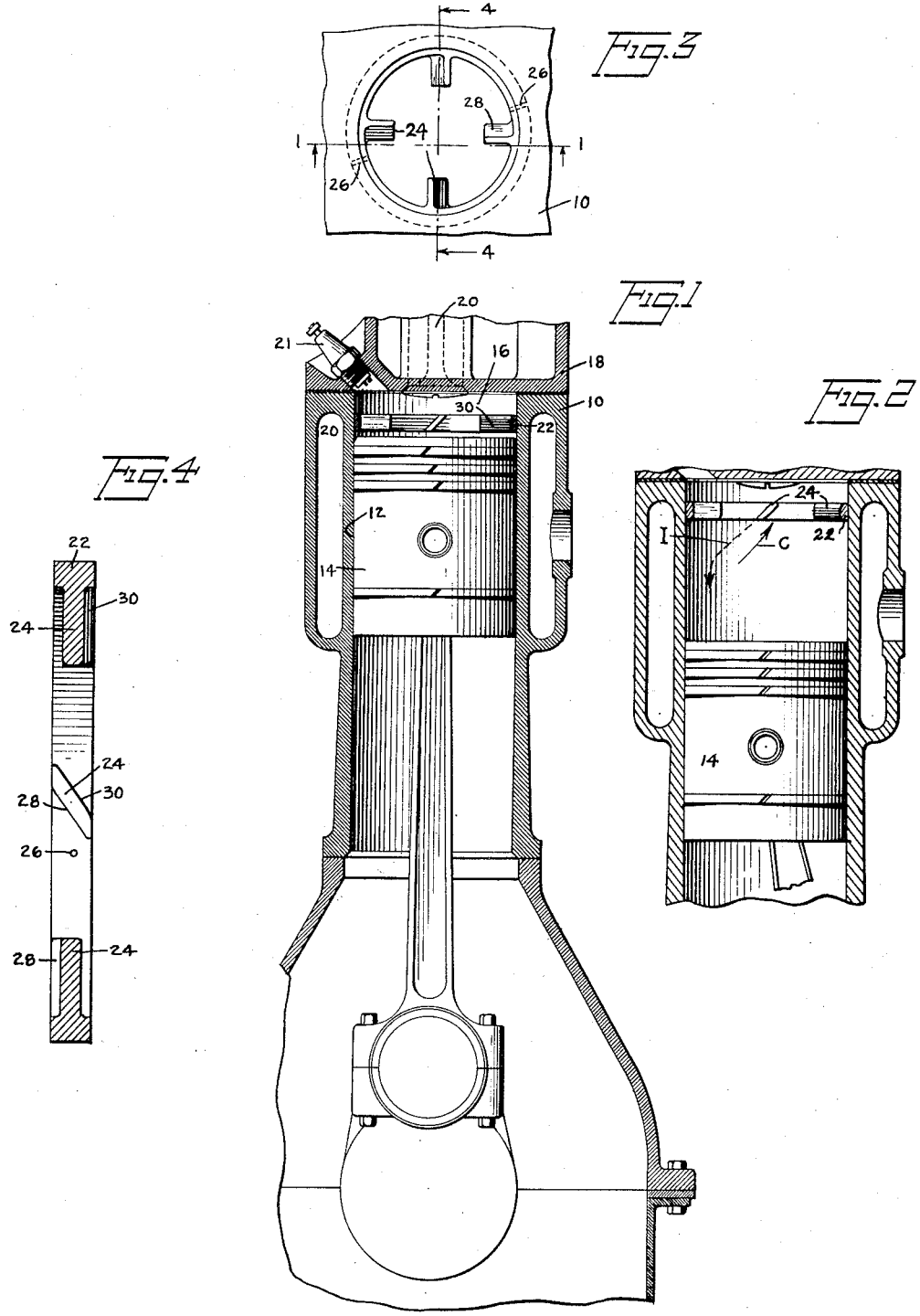
INVENTOR
Arlington Moore
BY H. H. Dyke
ATTORNEY Feb. 12, 1929.
A. MOORE
1,701,537
INTERIOR AGITATOR FOR INTERNAL COMBUSTION ENGINES
Filed Dec. 20, 1926    3 Sheets-Sheet 2
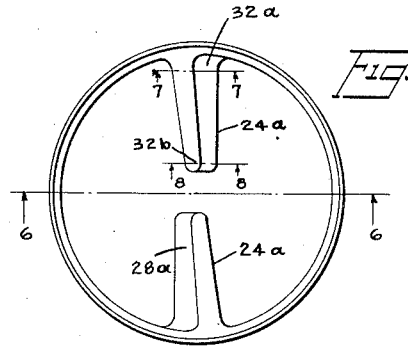
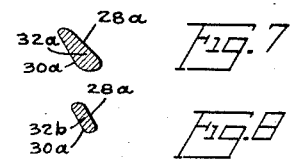
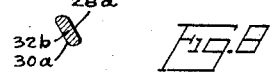
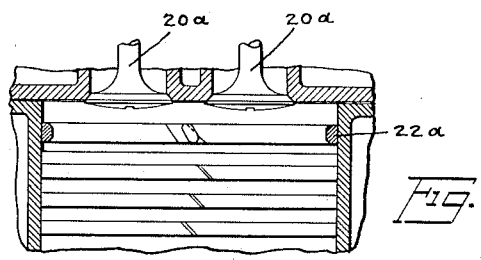
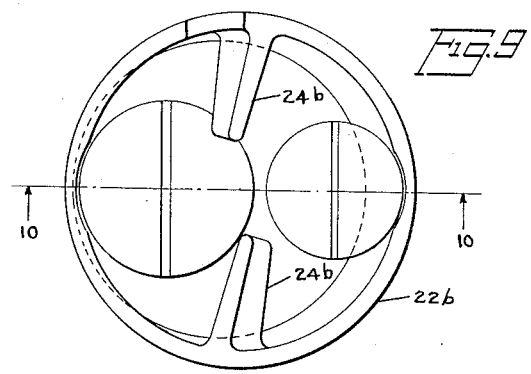
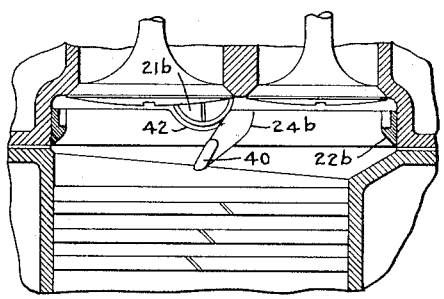
INVENTOR
Arlington Moore
BY
H. H. Dyke
ATTORNEY Feb. 12, 1929.
A. MOORE
1,701,537
INTERIOR AGITATOR FOR INTERNAL COMBUSTION ENGINES
Filed Dec. 20, 1926   3 Sheets-Sheet 3
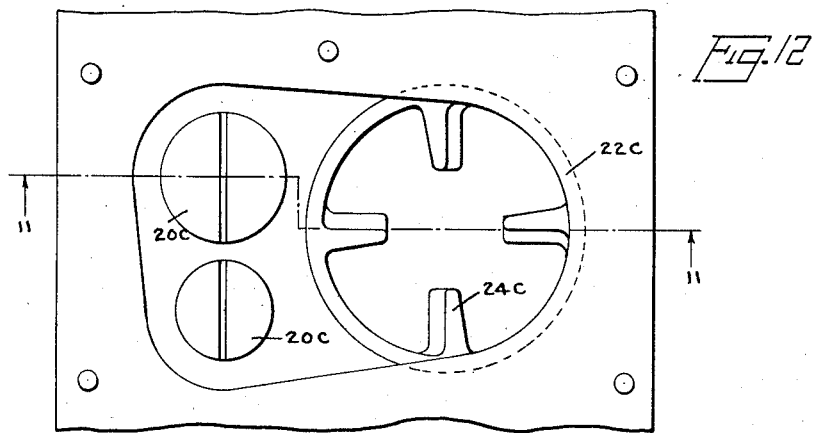
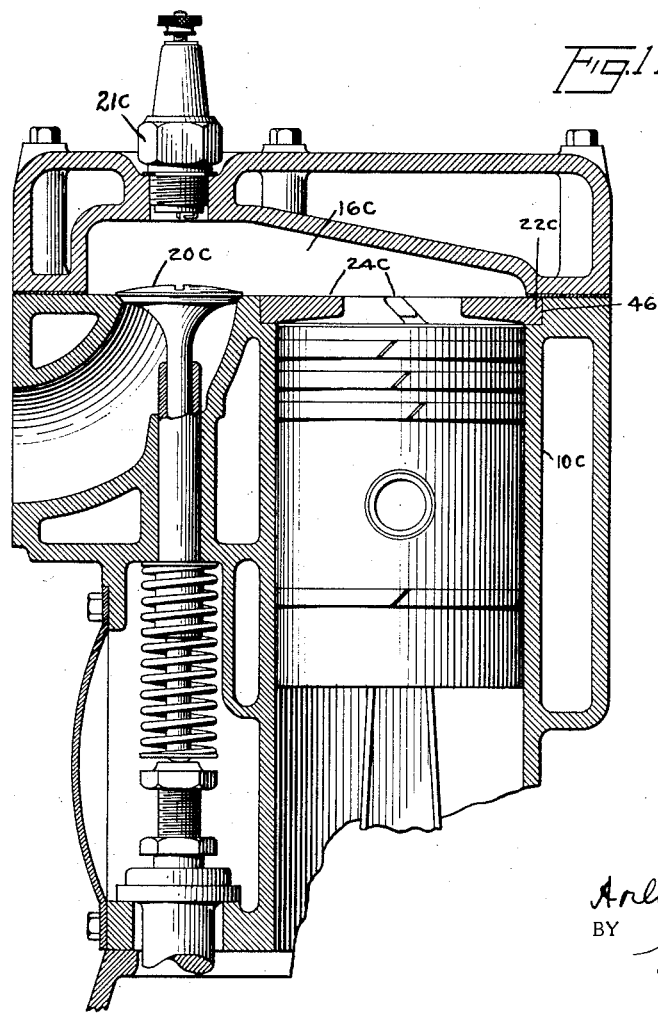
INVENTOR
Arlington Moore
BY
H. H. Dyke
ATTORNEY Patented Feb. 12, 1929.

1,701,537

UNITED STATES PATENT OFFICE.

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE.

INTERIOR AGITATOR FOR INTERNAL-COMBUSTION ENGINES.

Application filed December 20, 1926. Serial No. 155,919.

My invention relates to an interior agitator for internal combustion engines.

The term power chamber is used herein to designate the cylinder bore space swept by the piston together with the combustion chamber, and the principal object of the invention is the provision of means, located within the power chamber, for imparting cyclonic agitation to the gases in said chamber.

The agitator of my invention preferably comprises inclined vanes, arranged in the combustion space over the space swept by the piston, and adapted to impart cyclonic movement to the gaseous charge material passing these vanes during engine operation.

While the vanes may be made integral with the cylinder block or cylinder head, I prefer, for constructional reasons and to facilitate machining operations and installation as an accessory on old engines, to provide a ring to be inserted in the engine with the vanes cast therein, and have shown such arrangement in the accompanying drawings, in which Figs. 1–10 illustrate valve-in-head engines provided with agitation means in accordance with my invention, and Figs. 11 and 12 illustrate an agitator installed in an L-head engine. Fig. 1 is a longitudinal section on the line 1—1, Fig. 3. Fig. 2 is a similar section showing the piston lower down in the cylinder. Fig. 3 is a plan view of the cylinder block of Fig. 1, and Fig. 4 is a section on line 4—4, Fig. 3. Figs. 5–8 show a modification. Fig. 5 is a plan view, Fig. 6 is a section on line 6—6, Fig. 5, and Figs. 7 and 8 are detail sections on lines 7—7 and 8—8, Fig. 5. Figs. 9 and 10 show a further modification, Fig. 9 being a plan view and Fig. 10 a section on line 10—10, Fig. 9. Of Figs. 11 and 12, showing an agitator for an L-head engine, Fig. 11 is a section on the broken line 11—11, Fig. 12, and Fig. 12 is a plan view of the cylinder block.

Referring to Figs. 1–4, reference character 10 designates the cylinder block containing cylinder bore 12, 14 the piston, 16 the combustion chamber, 18 the cylinder head, 20 one of the over-head valves, and 21 the spark plug. The combustion chamber 16 shown is cylindrical, forming in effect an extension of the cylinder bore 12.

The agitator comprises a ring 22, preferably of cast iron, and the inwardly directed radial vanes preferably cast integral with ring 22. Ring 22 has preferably a forced fit in combustion chamber 16 and may be secured in place by suitable means, such as the pins or dowels 26.

The vanes 24 shown in Figs. 1–4, are four in number arranged at substantial equidistant intervals, and their upper and lower surfaces 28, 30 are inclined at an angle of about 45 degrees to the cylinder axis.

In the modified form shown in Figs. 5–8, the number of the vanes 24ª has been reduced to two. The two vanes 24ª are spaced substantially 180 degrees apart, and are made somewhat longer than in the form of Figs. 1–4. These two vanes 24ª are preferably arranged as shown along a line making substantially a right angle with the line joining the centers of the valves 20ª, so as not to directly present an obstacle to the ingress and egress of gases through the valves, and the ring 22ª is beveled or chamfered off on its edges and presents substantially a Venturi section at the entrance to the cylinder bore space.

In this form the upper and lower vane surfaces are unlike. The upper surface 28ª which exerts the major effect productive of cyclonic agitation on the intake stroke has a portion 32ª near the base or junction of the vane with the ring 22ª, which is inclined to make an angle of about 45 degrees with the cylinder axis. (See Fig. 7.) Further out on the vane as at 32ᵇ this inclination is reduced to about 30 degrees (see Fig. 8), and there is a gradual transition from the greater to the less inclination, as will be plain from the drawings. This arrangement is for the purpose of obtaining a somewhat eccentric swirling or cyclonic agitation of the gases and avoiding at least in part, the tendency to production of an axial vortex.

The under surfaces of 30ª of vanes 24ª, make a uniform lesser angle, in the form shown, an angle of about 30 degrees, with the cylinder axis, this angle being well adapted both for securing the desired agitation on the compression stroke and for permitting free egress movement through the exhaust valve during the exhaust or scavenging stroke.

The form of Figs. 9 and 10 is suitable for a valve-in-head engine of the type having the bore of the combustion chamber somewhat greater than that of the cylinder in order to permit increase of valve port area. In such case the location of ring 22$^b$ is somewhat higher, or further from the top center piston head position, than in the case where the combustion chamber bore is substantially the same as that of the cylinder, and the vanes 24$^b$, while otherwise much the same in location, formation and operation as in the showing of Figs. 5–8, are lowered or offset and come closer to the piston head at their inner ends, as shown at 40, than the ring 22$^b$, in order not to interfere with the free opening of the valves 20$^b$, and the ring 22$^b$ is cut away, as indicated at 42 to give plenty of room about the ignition end of the spark plug, which is located substantially alongside one of the vanes 24$^b$, ensuring substantially maximum agitation and rapidity of flame propagation at the point of ignition. (The spark plug for the form of Figs. 5–8 may be located in much the same way as in the form of Figs. 9 and 10 and for like reasons.)

In the case of the L-head engine having the side valves 20$^c$, Figs. 11 and 12, the ring 22$^c$ is preferably fitted in a counter-bore groove 46, formed in the cylinder block 10$^c$ above the top center piston position, with the radial vanes 24$^c$ in the mouth of the cylinder bore where same communicates with the combustion chamber 16$^c$. The arrangement and inclination of the vanes 24$^c$ is substantially the same as in Figs. 1–4, but, as will be understood, modifications such as shown, for example in Figs. 5 to 10, may be resorted to, if desired.

It will be apparent that cyclonic agitation of high rapidity is produced by the action of the vanes on the moving gases, with resulting elimination of localized stagnation. In the case of the four cycle engine shown herein for purposes of illustration, the effect produced extends through all strokes of the cycle. The gases left in the combustion chamber after the exhaust stroke are thus in violent cyclonic movement when the new charge enters, as the piston descends the gases upon being drawn or forced into the cylinder bore are set into cyclonic movement by the vanes, (see dotted arrow I, Fig. 2) and this movement is reversed during the compression stroke, (see full line arrow C, Fig. 2) so that upon ignition just before the end of the compression stroke the gases are in rapid cyclonic movement adapted to mechanically spread the flame wave with high rapidity, and the inert unscavenged gases are thoroughly distributed throughout the charge material, in which state they are best adapted to prevent detonation.

It will also be apparent that in addition to the gases of the new charge being homogenized and admixed with the unscavenged gas of the prior cycle, a practically even heat distribution is secured by the agitation of the compressed gases, and localized heat excess avoided. Transfer of heat to the cylinder walls is much improved by the cyclonic agitation, which appears to operate to substantially scour or scrub away the insulating adherent gaseous layer of film therefrom, which ordinarily prevents efficient transfer of heat. Furthermore, there is an extremely efficient heat transfer from one cycle to the next. The vanes extending into the interior region, where the tendency to excess heat during combustion is greatest, take up heat from the burning gases during the power stroke and deliver part of this heat to the incoming charge of the next cycle. This delivery of heat to the incoming gases at a distance from the walls supplements heat delivery from the jacket walls, which also give up heat to the incoming charge material, and does this the more effectively because of the film scrubbing action just described. Thus the fuel is efficiently gasified by the agitation and heat and practically complete combustion obtained, the analysis of exhaust gases showing very material reduction of the carbon monoxide content, and a corresponding increase in carbon dioxide content. The relatively short vanes, such as those shown at Figs. 3 and 12, however, do not get overheated to an extent to produce preignition, both because of the extraction of heat by incoming charges and by reason of rapid heat transfer to the cooling medium, the ring 22, 22$^a$, having a force fit when cold, being in very intimate contact with the walls when expanded by heat. If desired the vanes may be made integral with the power chamber walls as stated above and such construction is particularly well adapted for rapid and efficient transfer of heat to the cooling medium.

I have made a discovery, which has been verified in practice, that highly heated portions or "hot spots" may be advantageously employed, contrary to the accepted view, within the combustion chamber spaces for improving the combustion of the fuel charge upon the ignition thereof by the spark plug without causing premature ignition or detonation of the fuel charge. The means I employ for effecting the above result includes the relatively long, tapering, inclined vanes 24$^a$ or 24$^b$ illustrated at Figs. 5 to 9, in which the heat absorbing and emitting capacity of the exposed surfaces thereof is relatively large compared to the heat conducting capacity of the bases thereof.

Inasmuch as the temperature within the combustion chamber due to previous successive explosions is very high, the vanes or prongs 24$^a$ or 24$^b$ become highly heated, the heat being absorbed thereby more rapidly than the same can be conducted to the water-backed portions. As a result thereof, the outer, more constricted regions or areas of said prongs or vanes are highly heated when the fresh fuel charge is admitted to the cylinder, and approach, according to my present theory, an incandescent condition.

The mechanical arrangement of the vanes produces, however, a cyclonic, or rotary movement of said fuel mixture in opposite directions as the same sweeps past the vanes at a high speed upon the intake and compression strokes of the piston. The contact of the rapidly moving gaseous mass of fuel with the heated areas on the vanes is therefore so brief that the heat from the prongs absorbed by the gaseous portions is less than that required to cause premature ignition of any part thereof, although the particles or globules of fuel are thoroughly vaporized thereby, and the mass uniformly heated without impairing the volumetric efficiency thereof.

The gaseous mass, simultaneously with the mechanical action of the vanes thereon, is subjected to the action of the radiations or emanations issuing from said heated areas or regions which, according to my present theory, act on said gaseous mass like or as a catalytic agent for rendering the component parts of the fuel mixture more sensitive in their reactions, when the same are ignited, and causing instantaneous reaction and complete combustion thereof. In said invention the parts which serve as the heated portions for improving the combustion of the fuel mixture also serve to produce a turbulent movement of the gaseous mass and thoroughly mix the same, whereby to oppose the tendency of said heated, or incandescent, portions to cause premature ignition of the gaseous mass, and to facilitate the propagation of the flame when the fuel is properly ignited.

Engines equipped with my agitators are much less dependent upon manual or automatic spark advances than engines not so equipped and operate very satisfactorily with fixed spark position. With the agitators installed, increase of engine speed increases the speed and violence of the agitation imparted to the confined gases, and this in turn speeds up flame propagation, and the results obtained on a fixed spark setting are similar to what is ordinarily obtained without the agitators by advancing the spark. Reversely, with slow engine speed agitation is much less severe and flame propagation is slower with a resulting reduction in need for retarding the spark.

With the installation of agitators in accordance with my invention, the clearance space is materially reduced, with a corresponding rise in compression ratio, and, if desired, the clearance space can be still further reduced and the compression ratio correspondingly increased, as by raising the piston heads or in other equivalent manner. Compression ratios of the order of 6 to 1 can thus be made use of without resulting detonation, and this when the engine is operated on gasoline or equivalent fuel and without the use of anti-detonation fuel dopes. Smoothness of engine operation is greatly improved, marked improvement in fuel economy is obtained, and engine starting is greatly facilitated, the agitation assisting to vaporize higher boiling parts of the fuel and make same available for starting along with the lighter end point parts of the fuel, which ordinarily are the only parts of the fuel burned upon starting a cold engine.

It will be seen that the present invention enables very considerable improvements in engine performance to be obtained in a very cheap and simple manner, and that it is applicable to old and new engines alike.

The scope of my invention is defined by the following claims by which I intend to cover all that is new herein.

I claim:

1. An interior agitator for internal combustion engines, comprising a ring having inwardly extending inclined vanes, the inner ends of the vanes being offset with respect to the ring and outer ends of the vanes.

2. An interior agitator for internal combustion engines, comprising vanes located above the space swept by the piston, said vanes having inclined upper and lower surfaces, with the lower surface making a smaller angle with the cylinder axis than the upper surface.

3. An interior agitator for internal combustion engines comprising vanes projecting inwardly from the wall portions of the power chamber over the space swept by the piston, said vanes having inclined upper and lower surfaces and at least one of said inclined surfaces making different angles with the cylinder axis at different points in the length of the vane.

4. In an internal combustion engine, an engine cylinder having a combustion chamber at the end thereof, a piston in said cylinder, and a member above said piston having an opening therein at least approximately coextensive in area with that of the bore of said cylinder and having an edge portion about said opening lying approximately in alignment with the circular edge of said piston, and an inclined member projecting from the edge portion of said member about said opening, and extending transversely over the end of said piston from substantially the edge thereof towards the center thereof.

5. In an internal combustion engine, an egine cylinder having a combustion chamber at the end thereof, a piston in said cylinder, and a ring having a diameter at least substantially as great as the diameter of the bore of said cylinder and fitting in the combustion chamber over the top center position of the piston; said ring having inclined vanes thereon extending inwardly therefrom and transversely above the end of said piston from substantially the edge thereof towards the center thereof.

6. In an internal combustion engine, an engine cylinder, a piston therein, a cylinder head thereon forming a combustion chamber with the upper portion of said cylinder, a member intermediate the transverse portion of said head and said piston; said member having an opening therein at least approximately cextensive in area with that of the combustion chamber spaces at the opposite sides thereof, and with that of said piston, and an inclined vane on said member extending inwardly therefrom and transversely over the end of said piston from substantially the edge thereof towards the center thereof.

7. In an internal combustion engine, a cylinder, a piston therein, valves in the head of said cylinder over said piston, and transversely inclined vanes projecting inwardly from the walls of the combustion chamber intermediate said valves and the piston at the top center position thereof; said vanes longitudinally converging towards said piston to provide a clearance between the said vanes and said valves to permit of the free operation thereof.

8. In an internal combustion engine, a cylinder, a piston therein, valves in the head of said cylinder over said piston, and inclined vanes projecting inwardly from the walls of the combustion chamber intermediate said valves and the piston at the top center position thereof; said vanes being arranged transversely to the line joining the centers of said valves.

9. In an internal combustion engine, a cylinder, a piston therein, valves in the head of said cylinder over said piston, and inclined vanes projecting inwardly from the walls of the combustion chamber intermediate said valves and said piston in the top center position thereof, and extending towards said piston and away from said valves; said vanes being arranged substantially at right angles to the line joining the centers of said valves.

10. In an internal combustion engine, a cylinder having a combustion chamber at one end thereof, a piston in said cylinder, means for admitting a mixture of fuel and air to said combustion chamber, and a transversely inclined vane for imparting a cyclonic movement to the fuel mixture supported at the base thereof on the wall of said combustion chamber and extending at the free end portion thereof transversely over the end of said piston in the top center position thereof from substantially the edge thereof towards the axis of said cylinder; said vane towards the free end thereof including means serving to direct the swirling mixture towards the axis of said cylinder for insuring a uniform distribution of said mixture within said cylinder.

11. In an internal combustion engine, a cylinder having a combustion chamber at one end thereof, a piston in said cylinder, means for admitting a mixture of fuel and air to said combustion chamber, and a member disposed on the wall of said combustion chamber and extending over the piston in the top center position thereof towards the axis of said cylinder; said member having an inclination relative to the axis of said cylinder which varies from one end thereof towards the other, whereby to impart a cyclonic agitational movement to said mixture and direct the swirling mass towards said axis.

12. In an internal combustion engine, a cylinder having a combustion chamber at the end thereof, a piston in said cylinder, means for admitting a mixture of fuel and air to said combustion chamber, and a vane on the wall of said combustion chamber over the piston in the top center position thereof extending towards the axis of said cylinder; said vane having a surface making angles with the cylinder axis, decreasing in magnitude towards the end of said vane in proximity to said axis.

13. In an internal combustion engine, a cylinder having a combustion chamber at the end thereof, a piston in said cylinder, and a member over said piston in the top center position thereof extending towards the axis of said cylinder from the wall portion of said combustion chamber surrounding said axis; said member having an upper surface making angles with the cylinder axis decreasing in magnitude towards the end of said member in proximity to said axis, and a lower surface making a smaller angle with the cylinder axis than said upper surface at the portions thereof making the larger angles with said axis.

14. In an internal combustion engine, a cylinder having a combustion chamber at the end thereof, a piston in said cylinder, and a member on the wall of said combustion chamber extending over said piston in the top center position thereof inwardly towards the axis of said cylinder; said member having inclined upper and lower surfaces making different angles with the cylinder axis.

15. In an internal combustion engine, a cylinder having a combustion chamber at the end thereof, a piston in said cylinder, intake and exhaust valves in said combustion chamber, and an annular member disposed within said combustion chamber between said valves and said piston in the top center position thereof, and having a diameter approximately as great as that of said cylinder; said annular member having a single pair of vanes projecting therefrom towards the axis of said cylinder.

16. In an internal combustion engine, a cylinder having a combustion chamber at the end thereof, a piston in said cylinder, intake and exhaust valves in the top of said combustion chamber above said piston, and an annular member disposed within said combustion chamber between said valves and said piston in the top center position thereof, and having a diameter approximately as great as that of said cylinder; said annular member having a single pair of inclined vanes extending therefrom inwardly towards the axis of said cylinder at substantially right angles to the line connecting the centers of said valves and directed at the free ends thereof towards said piston to provide a clearance for said valves; and said vanes having upper surfaces making angles with said axis decreasing in magnitude towards the free ends thereof and lower surfaces of uniform inclination making a smaller angle with said axis than the portions of the upper surfaces of said vanes at the bases thereof.

17. In an internal combustion engine, a cylinder having a combustion chamber at the end thereof, a piston in said cylinder, means for admitting a mixture of fuel and air to said combustion chamber, and a transversely inclined vane supported at the base thereof on the lateral wall portion of said combustion chamber intermediate said means and said piston in the top center position thereof at a point approximately in line with the surface of the cylinder bore surrounding said piston, and extending at the free end portion thereof over said piston from substantially the edge thereof towards the center; the inclined free end portion of said vane serving to absorb on the power stroke heat from the hotter gases in the central portions of said combustion chamber and to transmit heat to the incoming charge on the succeeding cycle, and the portions of said combustion chamber above and below said vane freely communicating with each other past the sides and free end of said vane, whereby to impart a cyclonic agitational movement to said charge as the same is acted upon by said piston.

18. In an internal combustion engine, a cylinder having a combustion chamber at the end thereof, a piston in said cylinder, means for admitting a mixture of fuel and air to said combustion chamber, and a plurality of relatively long, transversely inclined members supported at the bases thereof on the lateral wall portions of said combustion chamber intermediate said means and said piston in the top center position thereof at points approximately in line with the surface of the cylinder bore surrounding said piston, and extending transversely over said piston from approximately the edge thereof and terminating in separated relation to each other at points in proximity to the central hotter portions of said combustion chamber; the exposed surfaces of each of said members having a relatively large heat absorbing and emitting capacity compared to the heat conducting capacity of the base thereof, and adapted to approach the incandescent state as heat is absorbed thereby upon the power stroke and to emit heat to the incoming charge upon the intake stroke; and said members serving to maintain said charge in constant agitation to prevent undue heating thereof by said members.

19. In an internal combustion engine, a cylinder having a combustion chamber at the end thereof, a piston in said cylinder, means for admitting a mixture of fuel and air to said combustion chamber, and a transversely inclined vane supported at the base thereof on the wall of the combustion chamber at a point approximately in line with the surface of the cylinder bore surrounding said piston, and projecting at the free end portion thereof into the combustion chamber transversely over the piston from substantially the edge thereof inwardly; the portions of said combustion chamber above and below said vane freely communicating with each other past the sides and free end of said vane, whereby to impart a cyclonic movement to said mixture as the same sweeps over said vane upon reciprocating movement of the piston.

20. In an internal combustion engine, a cylinder having a combustion chamber at one end, a piston in said cylinder, and a pair of transversely inclined vanes supported at the bases thereof on the wall of the combustion chamber at opposite sides thereof, and projecting at the free end portions into the combustion chamber above the piston; said vanes extending over said piston inwardly along lines eccentric relative to and at opposite sides of the axis of the cylinder.

21. In an internal combustion engine, a cylinder having a combustion chamber at one end, a piston in said cylinder, and a pair of transversely inclined vanes supported at the bases thereof on the wall of the combustion chamber at opposite sides thereof, and projecting at the free end portions into the combustion chamber above the piston; said vanes extending over said piston inwardly along lines eccentric relative to and at opposite sides of the axis of the cylinder; and said vanes having a transverse inclination which decreases from the inner ends thereof towards the outer ends thereof, whereby to direct the swirling mass towards said axis.

In testimony whereof, I have signed my name hereto.

ARLINGTON MOORE.